(12) United States Patent
Kaida et al.

(10) Patent No.: US 7,815,204 B2
(45) Date of Patent: Oct. 19, 2010

(54) RACK-AND-PINION TYPE STEERING APPARATUS

(75) Inventors: Hidetoshi Kaida, Kanagawa (JP); Koichi Inagaki, Kanagawa (JP)

(73) Assignee: Oiles Corporation, Tokyo (JP)

( * ) Notice: Subject to any disclaimer, the term of this patent is extended or adjusted under 35 U.S.C. 154(b) by 76 days.

(21) Appl. No.: 12/297,916

(22) PCT Filed: Apr. 20, 2007

(86) PCT No.: PCT/JP2007/000435
§ 371 (c)(1),
(2), (4) Date: Dec. 29, 2008

(87) PCT Pub. No.: WO2007/125647
PCT Pub. Date: Nov. 8, 2007

(65) Prior Publication Data
US 2009/0174164 A1      Jul. 9, 2009

(30) Foreign Application Priority Data
Apr. 24, 2006   (JP) ............................. 2006-119661

(51) Int. Cl.
*B62D 3/12* (2006.01)
(52) U.S. Cl. ................ 280/93.514; 74/422; 74/498
(58) Field of Classification Search ............ 280/93.514; 180/428; 74/422, 29–31, 33, 89.11, 89.12, 74/89.17, 498
See application file for complete search history.

(56) References Cited

U.S. PATENT DOCUMENTS

| 7,275,456 B2 * | 10/2007 | Yamamoto et al. ............ 74/422 |
| 2001/0025738 A1 * | 10/2001 | Irvine et al. ................. 180/428 |
| 2002/0124670 A1 * | 9/2002 | Bugosh ................... 74/388 PS |
| 2002/0162412 A1 * | 11/2002 | Harer et al. ................... 74/422 |
| 2004/0108676 A1 * | 6/2004 | Bareis ................... 280/93.514 |

FOREIGN PATENT DOCUMENTS

| JP | 6-239245 | 8/1994 |
| JP | 10-217984 | 8/1998 |

(Continued)

OTHER PUBLICATIONS

International Search Report for PCT/JP2007/000435, mailed Jun. 26, 2007.

(Continued)

*Primary Examiner*—Ruth Ilan
(74) *Attorney, Agent, or Firm*—Nixon & Vanderhye P.C.

(57) ABSTRACT

A rack-and-pinion type steering apparatus 1 includes a housing 3 having a cylindrical holding hole 2 in its interior; a pinion 6 which is disposed in the housing 3 rotatably in a direction R about an axis O by means of bearings 4 and 5; a rack bar 8 which has rack teeth 7 meshing with the pinion 6 and is movable in a direction A; a rack guide 9 which is disposed in the holding hole 2 within the housing 3 movably in a direction C, and which guides and supports the rack bar 8 movably in the direction A; and a coil spring 10 for resiliently pressing the rack teeth 7 of the rack bar 8 against the pinion 6 by means of the rack guide 9.

7 Claims, 7 Drawing Sheets

FOREIGN PATENT DOCUMENTS

JP       2004-123063         4/2004
JP       2005-132287  A  *  5/2005

OTHER PUBLICATIONS

Microfilm of the specification and drawings annexed to the request of Japanese Utility Model Application No. 47573/1998 (Laid-open No. 149870/1989), NOK Corp., (Oct. 17, 1989).

Microfilm of the specification and drawings annexed to the request of Japanese Utility Model Application No. 115067/1981 (Laid-open No. 19873/1983), Toyo Kogyo Kabushiki Kaisha., (Feb. 7, 1983).

CD-Rom of the specification and drawings annexed to the request of Japanese Utility Model Application No. 56744/1993 (Laid-open No. 56744/1993), Koyo Seiko Co., Ltd.., (Jul. 27, 1993).

Microfilm of the specification and drawings annexed to the request of Japanese Utility Model Application No. 193882/1982 (Laid-open No. 97163/1984), Oiles Corp.), Jul. 2, 1984).

* cited by examiner

US 7,815,204 B2

RACK-AND-PINION TYPE STEERING APPARATUS

TECHNICAL FIELD

The present invention relates to a rack-and-pinion type steering apparatus.

BACKGROUND ART

Patent Document 1: microfilm of Japanese Utility Model Application No. 56-115067

Patent Document 2: JP-A-6-239245

A rack-and-pinion type steering apparatus generally has a configuration such as the one shown in FIG. 15, and a rack-and-pinion type steering apparatus 1 shown in FIG. 15 is comprised of a pinion 6 which is rotatably disposed in a housing 3 by means of bearings 4 and 5 so as to be rotated by steering; a rack bar 8 having rack teeth 7 meshing with the pinion 6 so as to be moved in a direction perpendicular to the plane of the drawing by the rotation of the pinion 6; a rack guide 9 which is movably disposed in a cylindrical holding hole 2 extending in a lateral direction inside the housing 3 (in a perpendicular direction to the movement of the rack bar 8); and a coil spring 10 which is disposed between the housing 3 and the rack guide 9 to resiliently press the rack teeth 7 of the rack bar 8 against the pinion 6 by means of the rack guide 9. An annular clearance Δ for allowing the movement of the rack guide 9 toward the pinion 6 is provided between an outer peripheral surface 31 of a rack guide body 22 of the rack guide 9 and an inner peripheral surface 15 of the housing 3 for defining the holding hole 2.

DISCLOSURE OF THE INVENTION

Problems that the Invention is to Solve

In such a rack-and-pinion type steering apparatus 1, runout occurs in the rack bar 8 about its axis owing to a reaction force acting from a road surface through wheels. If the annular clearance Δ between the outer peripheral surface 31 of the rack guide body 22 and the inner peripheral surface 15 of the housing 3 is large, the movement of the rack guide 9 along the radial direction of the holding hole 2 becomes large. Hence, there is a problem in that the noise of collision between the outer peripheral surface 31 of the rack guide body 22 and the inner peripheral surface 15 of the housing 3 and the noise of collision between the rack teeth 7 and the teeth of the pinion 6 become large.

Incidentally, in the rack-and-pinion type steering apparatus 1, the housing 3 is formed of aluminum or an aluminum alloy because of their light weight and ease of fabrication. In addition, the rack guide body 22, which is disposed in a cylindrical holding hole 2, is also formed of aluminum or an aluminum alloy because of their low cost in addition to their light weight and ease of fabrication.

In the case where the housing 3 and the rack guide body 22 are formed of aluminum or an aluminum alloy, the runout occurs in the rack bar 8 about its axis owing to the annular clearance Δ provided between the outer peripheral surface 31 of the rack guide body 22 and the inner peripheral surface 15 of the housing 3. If the rack guide body 22 is strongly pressed against the inner peripheral surface 15 side of the housing 3, coupled with the action of the pressing force due to the coil spring 10, the two members of the rack guide body 22 and the housing 3 are in the state of the so-called "metals of similar composition," so that the frictional resistance therebetween increases, and adhesive wear is hence brought about therebetween. Thus there arises the problem that the movement of the rack guide 9 in the direction toward the rack bar 8 is hampered.

To overcome the above-described problem, a proposal (contained in patent document 1) has been made in which an O-ring constituted by a rubber elastomer is interposed between the rack guide body 22 and the housing 3, and that O-ring is sandwiched between the outer peripheral surface 31 of the rack guide body 22 and the inner peripheral surface 15 of the housing 3, to thereby restrict the movement of the rack guide 9 along its radial direction. Also, a proposal (contained in patent document 2) has been made in which an elongated elastic member in the axial direction is sandwiched between the outer peripheral surface 31 of the rack guide body 22 and the inner peripheral surface 15 of the housing 3, to thereby restrict the movement of the rack guide 9 along its radial direction.

However, if such an O-ring or an elongated elastic member in the axial direction is sandwiched between the outer peripheral surface 31 of the rack guide body 22 and the inner peripheral surface 15 of the housing 3, the smooth axial movement of the rack guide 9 is hampered by the friction between that O-ring or the elastic member and the inner peripheral surface 15 of the housing 3. Hence, there arises the problem that the pinion 6 and the rack teeth 7 of the rack bar 8 cannot be meshed smoothly.

The present invention has been devised in view of the above-described circumstances, and its object is to provide a rack-and-pinion type steering apparatus which is capable of avoiding the collision between the outer peripheral surface of the rack guide body and the inner peripheral surface of the housing ascribable to the runout of the rack bar about its axis owing to the reaction force acting from the road surface through the wheels, and which is constantly capable of smoothly moving the rack guide in the direction toward the rack bar without causing the adhesive wear which is ascribable to the so-called "metals of similar composition" and can possibly occur frequently in the case where the housing and the rack guide body are formed of aluminum or an aluminum alloy.

Means for Solving the Problems

A rack-and-pinion type steering apparatus in accordance with the present invention comprises: a housing having a cylindrical holding hole in its interior; a pinion which is disposed rotatably in the housing and is rotated by steering; a rack bar which has rack teeth meshing with the pinion and is movable; a rack guide which is disposed movably in the holding hole within the housing, and which guides and supports the rack bar movably; and resilient means which is disposed between the housing and the rack guide to resiliently press the rack teeth of the rack bar against the pinion by means of the rack guide. Here, the rack guide includes: a rack guide body having a cylindrical outer peripheral surface, a wide annular recessed portion formed in the outer peripheral surface, and at least one narrow annular groove formed in a bottom surface of the wide annular recessed portion and having a narrower width than a width of the wide annular recessed portion; a sliding plate piece which is secured to the rack guide body and is brought into contact with an outer surface of the rack bar so as to support the rack bar movably; an endless annular elastic member fitted and secured in the narrow annular groove of the rack guide body in such a manner as to project from an opening of the narrow annular groove; and a cylindrical bush which has a split groove and is fitted and secured in the wide annular recessed portion, such that the cylindrical bush on an outer peripheral surface side thereof projects from an opening of the wide annular recessed portion of the rack guide body, while an inner peripheral surface of the cylindrical bush abuts against an outer surface of the endless annular elastic member, the cylindrical bush being fitted in the holding hole of the housing with an interference, an outer peripheral surface of the cylindrical bush being movably in contact with a cylindrical inner peripheral surface of the housing defining the holding hole of the housing.

According to the rack-and-pinion type steering apparatus in accordance with the invention, the endless annular elastic member is fitted and secured in the narrow annular recessed portion formed in the bottom surface of the wide annular recessed portion, and the cylindrical bush abutting against the outer peripheral surface of the endless annular elastic member is fitted and secured in the wide annular recessed portion. Therefore, it is possible to prevent collision between the outer peripheral surface of the rack guide body and the inner peripheral surface of the housing defining the holding hole, making it possible to eliminate the occurrence of collision noise. Moreover, it is possible to absorb the noise of collision between the rack teeth and the teeth of the pinion, thereby making it possible to reduce that collision noise. In addition, it is possible to reduce the sliding frictional resistance between the inner peripheral surface of the housing and the outer peripheral surface of the cylindrical bush fitted and secured to the outer peripheral surface of the rack guide body without causing adhesive wear which is ascribable to the "metals of similar composition" in the case where the housing and the rack guide body are formed of aluminum or an aluminum alloy. As a result, it is possible to constantly allow the movement of the rack guide in the direction toward the rack bar to be effected smoothly.

In the rack-and-pinion type steering apparatus in accordance with the invention, the wide annular recessed portion may have an annular recessed portion formed in the cylindrical outer peripheral surface of the rack guide body over its entire circumferential area, and the cylindrical bush may have a cylindrical portion which has one split groove and is fitted and secured in the annular recessed portion. Furthermore, the wide annular recessed portion may further have, in addition to the annular recessed portion, a pair of circular arc-shaped recessed portions continuous to the annular recessed portion and formed on mutually opposing outer peripheral surface portions in the cylindrical outer peripheral surface of the rack guide body, and the cylindrical bush may further have, in addition to the cylindrical portion, a pair of circular arc-shaped projecting portions which are formed integrally on the cylindrical portion in face-to-face relation to each other with the split groove located therebetween and which are respectively fitted and secured to the pair of circular arc-shaped recessed portions.

The rack guide body may be formed of aluminum, an aluminum alloy, or an iron-based sintered body, and the endless annular elastic member may be constituted by an O-ring made of rubber.

The cylindrical bush may be formed of a thermoplastic synthetic resin such as polyacetal resin, polyamide resin, and polybutylene terephthalate resin which exhibit self-lubricity. A lubricating substance such as lubricating oil, graphite, molybdenum disulfide, tetrafluoroethylene resin, or the like may be incorporated in such a synthetic resin. In addition, as the cylindrical bush, it is possible to use a winding bush which is formed such that a plate-like body, which is comprised of a backing plate formed of a steel plate, a porous sintered alloy layer formed integrally on the surface of that metal backing, and a synthetic resin layer filled in the pores of, and coated on the surface of, the porous sintered alloy layer, is convoluted into a cylindrical form with the synthetic resin layer facing the outer side.

In the rack-and-pinion type steering apparatus in accordance with the invention, an annular clearance between a bottom surface of the wide annular recessed portion of the rack guide body and the inner peripheral surface of the cylindrical bush may have a radial width which is smaller than a radial width of an annular clearance between the outer peripheral surface of the rack guide body and the inner peripheral surface of the housing defining the cylindrical holding hole.

In the state in which the rack guide is fitted in the cylindrical holding hole of the housing, if the annular clearance between the bottom surface of the wide annular recessed portion of the rack guide body and the inner peripheral surface of the cylindrical bush, which is fitted and secured in that wide annular recessed portion in such a manner as to cover the endless annular elastic member, has a radial width which is smaller than the radial width of the annular clearance between the outer peripheral surface of the rack guide body and the inner peripheral surface of the housing defining the cylindrical holding hole of the housing, it is possible to effectively avoid the collision between the outer peripheral surface of the rack guide body and the inner peripheral surface of the housing defining the cylindrical holding hole of the housing, as well as the occurrence of collision noise due to that collision. In particular, in the case where the housing and the rack guide body are formed of aluminum or an aluminum alloy, it is possible to reliably achieve the constant smooth movement of the rack guide in the direction toward the rack bar without causing adhesive wear which is ascribable to the "metals of similar composition" in addition to the above description.

ADVANTAGES OF THE INVENTION

According to the invention, it is possible to provide a rack-and-pinion type steering apparatus which is capable of avoiding the collision between the outer peripheral surface of the rack guide body and the inner peripheral surface of the housing ascribable to the runout of the rack bar about its axis owing to the reaction force acting from the road surface through the wheels, and which is constantly capable of smoothly moving the rack guide in the direction toward the rack bar without causing the adhesive wear which is ascribable to the so-called "metals of similar composition" and can possibly occur frequently in the case where the housing and the rack guide body are formed of aluminum or an aluminum alloy.

Hereafter, a more detailed description will be given of the present invention and the mode for carrying out the invention with reference to the preferred embodiment illustrated in the drawings. It should be noted that the invention is not limited by this embodiment.

BEST MODE FOR CARRYING OUT THE INVENTION

Figure 1:
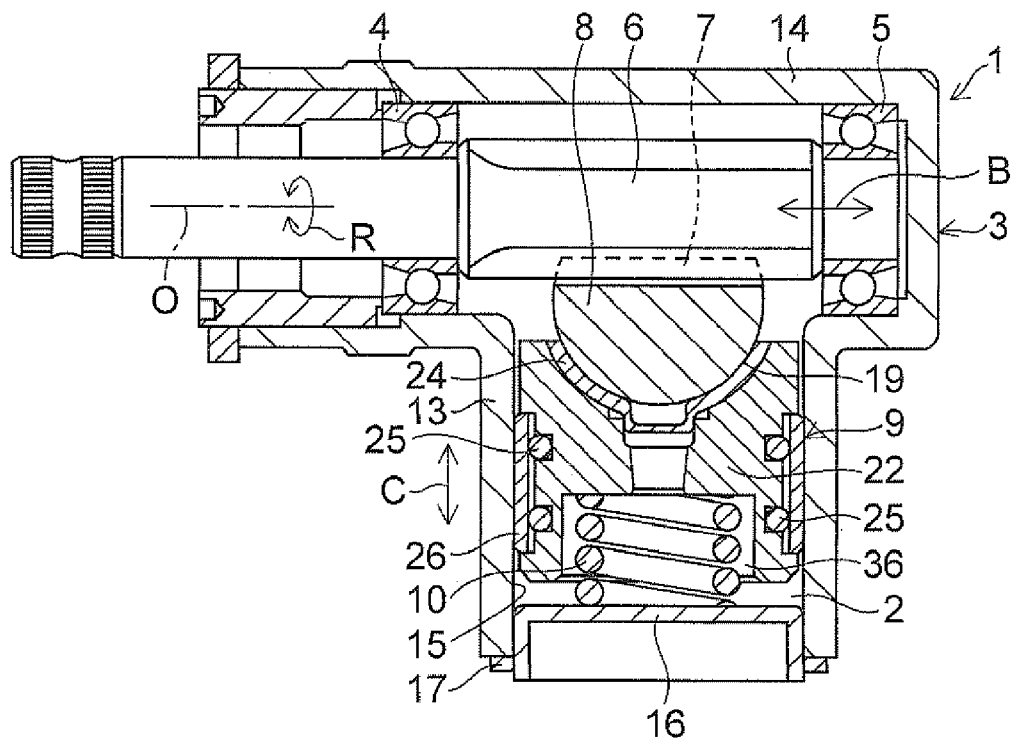
FIG. 1 is an explanatory cross-sectional view of a preferred embodiment of the invention.
Figure 2:
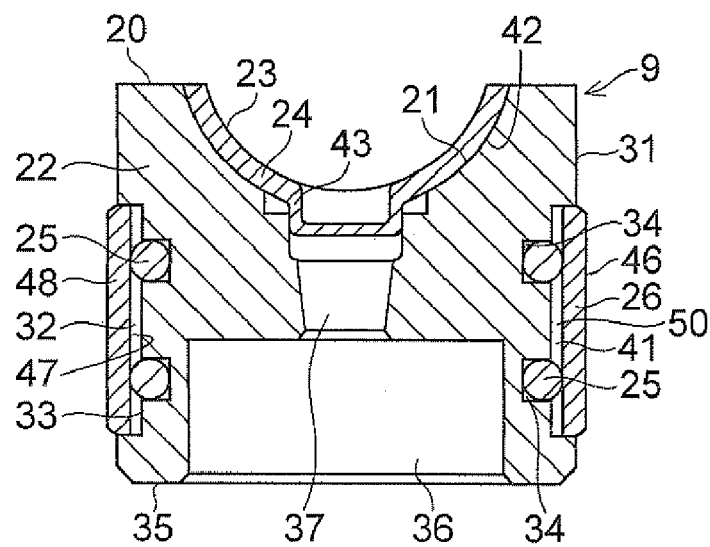
FIG. 2 is an explanatory cross-sectional view of a rack guide shown in FIG. 1.
Figure 3:
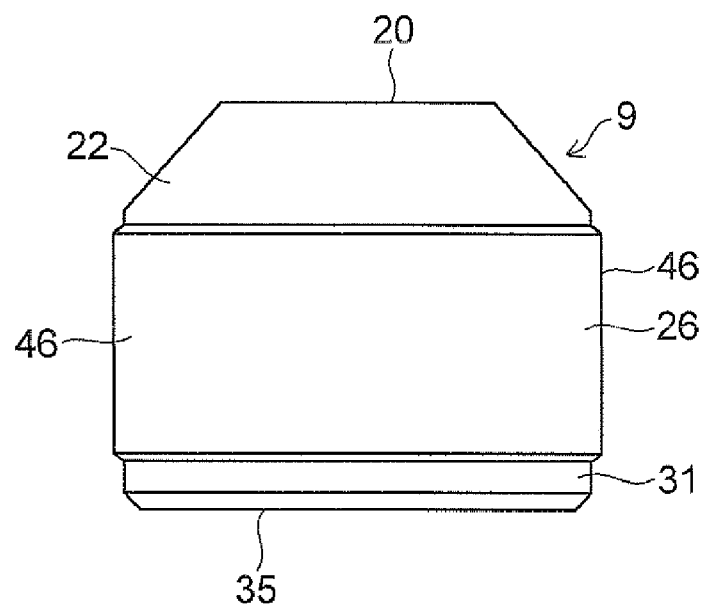
FIG. 3 is an explanatory front elevational view of the rack guide shown in FIG. 1.
Figure 4:
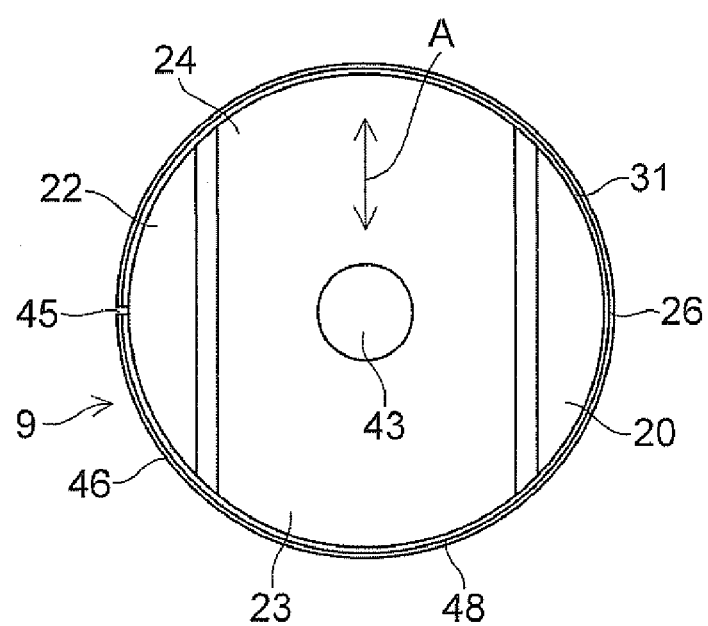
FIG. 4 is an explanatory plan view of the rack guide shown in FIG. 1.
Figure 5:
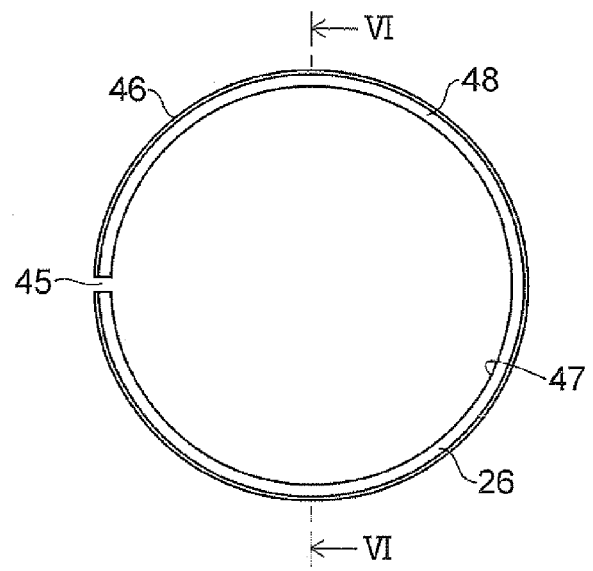
FIG. 5 is an explanatory plan view of a cylindrical bush which is fitted and secured to the rack guide shown in FIG. 1.
Figure 6:
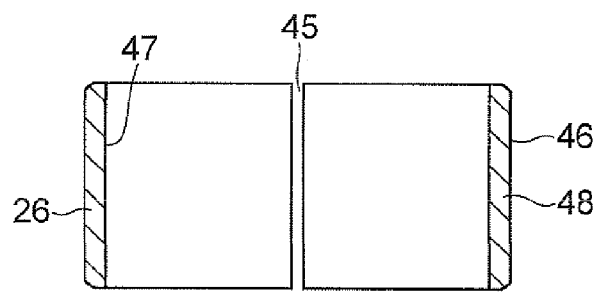
FIG. 6 is an explanatory cross-sectional view taken in the direction of arrows along line VI-VI in FIG. 5.
Figure 7:
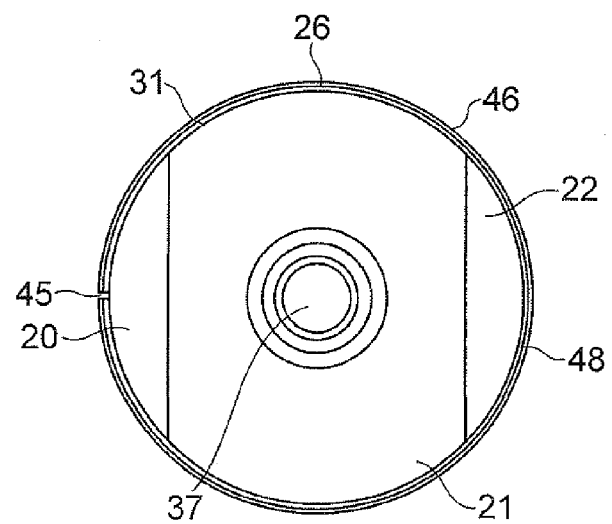
FIG. 7 is an explanatory plan view of a rack guide body shown in FIG. 1.
Figure 8:
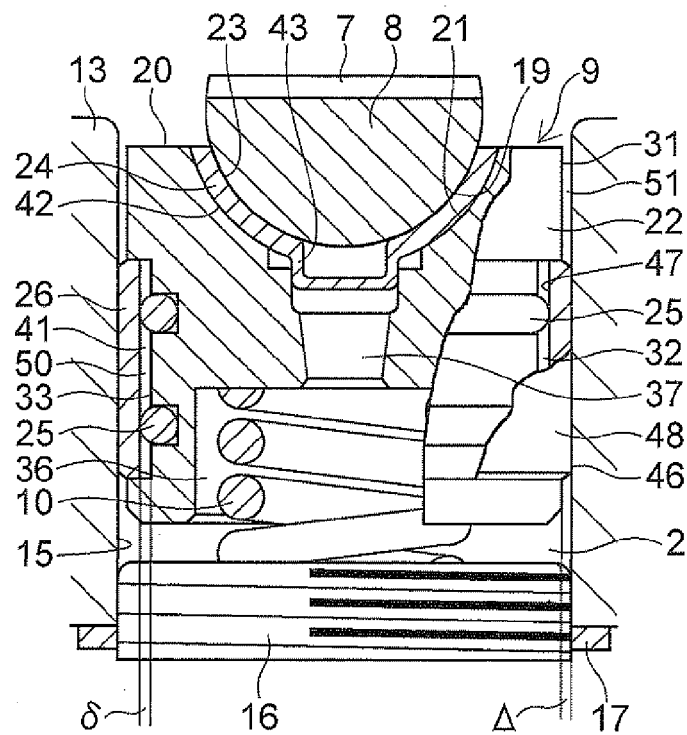
FIG. 8 is an enlarged explanatory cross-sectional view of essential portions in FIG. 1.
Figure 9:
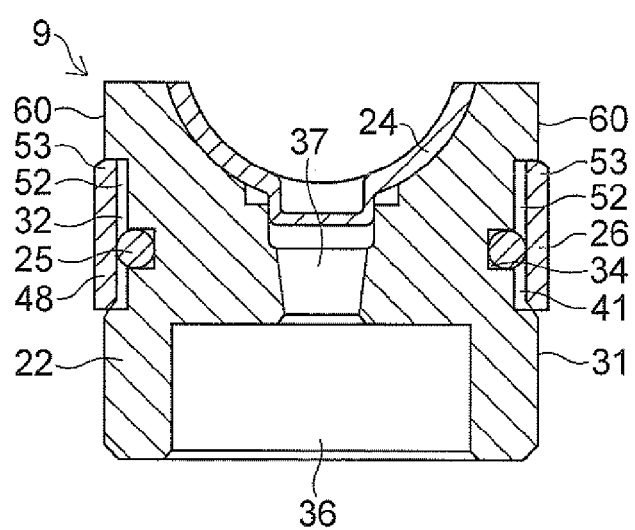
FIG. 9 is an explanatory cross-sectional view illustrating another form of the rack guide shown in FIG. 1.
Figure 10:
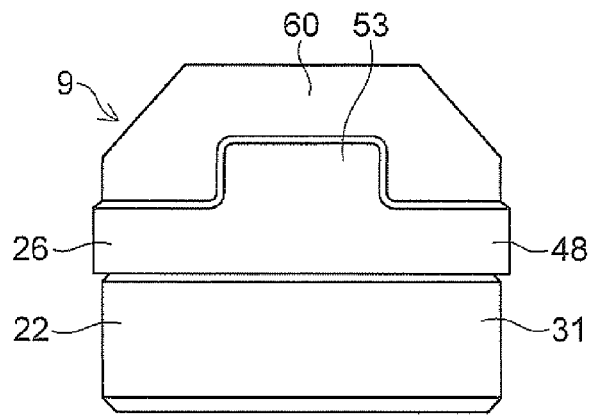
FIG. 10 is an explanatory front elevational view of the rack guide shown in FIG. 9.
Figure 11:
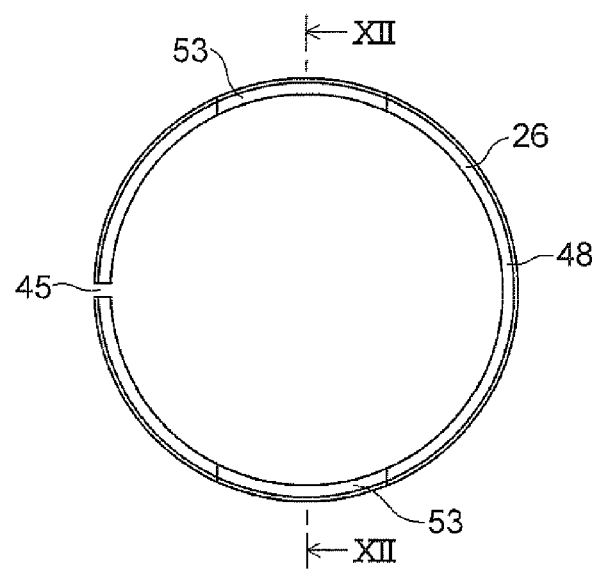
FIG. 11 is an explanatory plan view of the cylindrical bush which is fitted and secured to the rack guide shown in FIG. 9.
Figure 12:
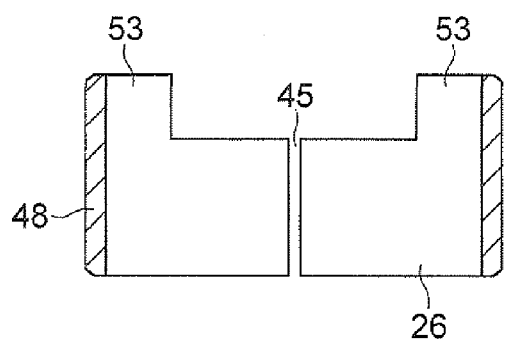
FIG. 12 is an explanatory cross-sectional view taken in the direction of arrows along line XII-XII in FIG. 11.
Figure 13:
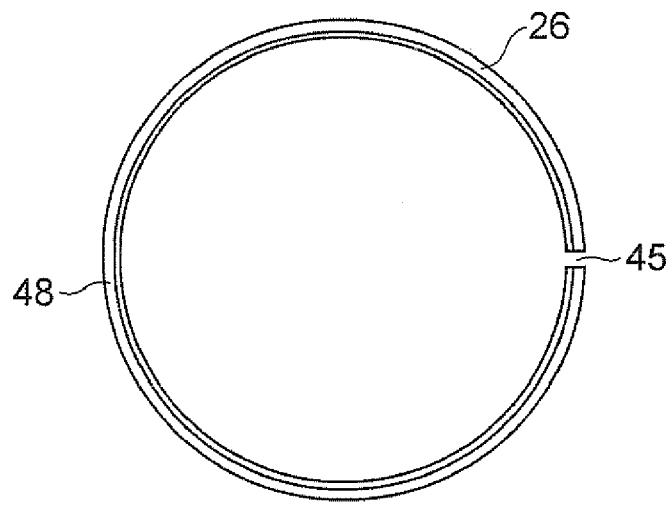
FIG. 13 is an explanatory bottom view of the cylindrical bush which is fitted and secured to the rack guide shown in FIG. 9.

In FIGS. 1 to 8, a rack-and-pinion type steering apparatus 1 in accordance with this embodiment is comprised of a housing 3 having a cylindrical holding hole 2 in its interior; a pinion 6 which is disposed in the housing 3 rotatably in a direction R about an axis O by means of bearings 4 and 5 and is rotated in the direction R by steering; a rack bar 8 which has rack teeth 7 meshing with the pinion 6 so as to be moved in the direction A perpendicular to the plane of the drawing of FIG. 1 by the rotation of the pinion 6 in the direction R and is movable in a direction A; a rack guide 9 which is disposed in the holding hole 2 within the housing 3 movably in a direction C perpendicular to the direction A and an axial direction B of the pinion 6, respectively, and which guides and supports the rack bar 8 movably in the direction A; and a coil spring 10 serving as a resilient means which is disposed between the housing 3 and the rack guide 9 to resiliently press the rack teeth 7 of the rack bar 8 against the pinion 6 by means of the rack guide 9.

The housing 3 includes a housing body 14 having a cylindrical portion 13 as well as a cover member 16 threadedly secured to an inner peripheral surface 15 of the cylindrical portion 13. The cover member 16 for closing one end face of the holding hole 2 formed in the cylindrical portion 13 is fixed to the cylindrical portion 13 by a lock nut 17 so that its state of threaded engagement with the cylindrical portion 13 will not loosen.

The rack bar 8 which is passed through the housing 3 and extends in the direction A has a circular arc-shaped convex surface 19 on its side opposite to its side where the rack teeth 7 are formed.

As shown in detail in FIGS. 2 to 7, the rack guide 9 includes a rack guide body 22 which has a circular arc-shaped concave surface 21 on one end face 20 thereof and is formed of aluminum or an aluminum alloy; a sliding plate piece 24 which is secured to the circular arc-shaped concave surface 21 of the rack guide body 22 and has a circular arc-shaped inner surface 23 for being brought into contact with the circular arc-shaped convex surface 19 of the rack bar 8 relatively movably in the direction A, so as to support the rack bar 8 movably in the direction A; a pair of O-rings 25 made of rubber and serving as endless annular elastic members provided on the rack guide body 22; and a cylindrical bush 26 made of synthetic resin and similarly provided on the rack guide body 22.

The rack guide body 22 has, in addition to the circular arc-shaped concave surface 21, a cylindrical outer peripheral surface 31; a wide annular recessed portion 32 formed in the outer peripheral surface 31; at least one, in this embodiment two, narrow annular grooves 34 formed in a cylindrical bottom surface 33 of the annular recessed portion 32 and each having a narrower width in the axial direction of the rack guide body 22, i.e., in the direction C, than the width of the wide annular recessed portion 32; a cylindrical recess 36 provided in another end face 35 opposing the one end face 20 where the circular arc-shaped concave surface 21 is disposed; and a through hole 37 which is disposed in a center of the circular arc-shaped concave surface 21 in such a manner as to communicate with the recess 36 on one side and to be open at the circular arc-shaped concave surface 21 on the other side.

The annular recessed portion 32 comprises by a circular ring-shaped recessed portion 41 formed in the outer peripheral surface 31 of the rack guide body 22 over its entire circumferential area.

The sliding plate piece 24 supports the rack bar 8 movably in the direction A, is comprised of a backing plate formed of a steel plate, a porous sintered alloy layer formed integrally on the surface of that metal backing, and a synthetic resin layer filled in the pores of, and coated on the surface of, the porous sintered alloy layer. The sliding plate piece 24 has the circular arc-shaped inner surface 23 on the synthetic resin layer side. In addition to the inner surface 23 having a shape complementary to the circular arc-shaped convex surface 19 of the rack bar 8, the sliding plate piece 24 has a circular arc-shaped outer surface 42 having a shape complementary to the circular arc-shaped concave surface 21 of the rack guide body 22 as well as a bottomed cylindrical portion 43 formed on a central portion of the outer surface 42. The sliding plate piece 24 at its bottomed cylindrical portion 43 is fitted in the through hole 37 of the rack guide body 22, and is seated at its outer surface 42 on the circular arc-shaped concave surface 21 of the rack guide body 22.

The O-ring 25 is provided on the rack guide body 22 by being fitted and secured in each of the narrow annular grooves 34 in such a manner as to radially project from an opening of each of these narrow annular grooves 34.

The cylindrical bush 26 has a cylindrical portion 48 which is formed of a thermoplastic synthetic resin such as polyacetal resin, polyamide resin, and polybutylene terephthalate resin which exhibit self-lubricity, or a thermoplastic synthetic resin in which a lubricating substance such as lubricating oil, graphite, molybdenum disulfide, tetrafluoroethylene resin, or the like is incorporated. The cylindrical portion 48 has a split groove 45 and is provided on the rack guide body 22 by being fitted and secured in the recessed portion 41 of the wide annular recessed portion 32, such that the cylindrical portion 48 on an outer peripheral surface 46 side thereof projects radially from the opening of the recessed portion 41 of the annular recessed portion 32, while an inner peripheral surface 47 of the cylindrical portion 48 abuts against the outer surface of the O-ring 25.

Before the rack guide 9 is fitted in the holding hole 2, a clearance is secured between end faces of the cylindrical portion 48 at the split groove 45, and a degree of freedom of deformation is hence imparted to the cylindrical bush 26 in its radially inward and outward directions.

The cylindrical bush 26 is fitted in the holding hole 2 with an interference, and its outer peripheral surface 46 is in contact with the inner peripheral surface 15 of the cylindrical portion 13 defining the holding hole 2 movably in the direction C.

In the state in which the rack guide 9 is fitted in the cylindrical holding hole 2 of the housing 3 with an interference, an annular clearance 50 between the bottom surface 33 of the recessed portion 41 and the inner peripheral surface 47 of the cylindrical portion 48 has a radial width δ which is smaller than a radial width Δ of an annular clearance 51 between the outer peripheral surface 31 of the rack guide body 22 and the inner peripheral surface 15 of the cylindrical portion 13.

According to the above-described rack-and-pinion type steering apparatus 1, the O-rings 25 are respectively fitted and secured in the annular grooves 34 formed in the bottom surface 33 of the recessed portion 41, and the cylindrical bush 26 having the cylindrical portion 48 abutting against the outer peripheral surface of the O-rings 25 is fitted and secured in the recessed portion 41. Furthermore, in particular, the annular clearance 50 has the radial width δ which is smaller than the radial width Δ of the annular clearance 51. Therefore, it is possible to prevent collision between the outer peripheral surface 31 of the rack guide body 22 and the inner peripheral surface 15 of the cylindrical portion 13 defining the holding hole 2, making it possible to eliminate the occurrence of collision noise. In addition, it is possible to constantly move the rack guide 9 smoothly in the direction toward the rack bar 8 without causing adhesive wear which is ascribable to the "metals of similar composition" between the rack guide body 22 and the cylindrical portion 13. Moreover, it is possible to absorb the noise of collision between the rack teeth 7 and the teeth of the pinion 6, thereby making it possible to reduce that collision noise as well.

In addition, according to the rack-and-pinion type steering apparatus 1, since the synthetic resin-made cylindrical portion 48 is fitted and secured to the outer peripheral surface 31 of the rack guide body 22, the sliding frictional resistance between the outer peripheral surface 46 of the cylindrical portion 48 and the inner peripheral surface 15 of the cylindrical portion 13 can be reduced, with the result that it is possible to constantly allow the movement of the rack guide 9 in the direction toward the rack bar 8 to be effected more smoothly.

The above-described rack guide 9 includes the annular recessed portion 32 constituted by the circular ring-shaped recessed portion 41 formed in the outer peripheral surface 31 of the rack guide body 22 over its entire circumferential area; the cylindrical bush 26 constituted by the cylindrical portion 48 fitted and secured in the recessed portion 41 of the annular recessed portion 32; the two narrow annular grooves 34; and the O-rings 25 respectively disposed in the annular grooves 34. Alternatively, as shown in FIGS. 9 to 13, the rack guide 9 may include: the wide annular recessed portion 32 further having, in addition to the recessed portion 41, a pair of circular arc-shaped recessed portions 52 continuous to the recessed portion 41 and formed on mutually opposing outer peripheral surface portions 60 in the outer peripheral surface 31 of the rack guide body 22; the cylindrical bush 26 further having, in addition to the cylindrical portion 48, a pair of synthetic resin-made circular arc-shaped projecting portions 53 which are formed integrally on the cylindrical portion 48 in face-to-face relation to each other with the split groove 45 located therebetween and which are respectively fitted and secured to the pair of circular arc-shaped recessed portions 52; the one narrow annular groove 34; and the one O-ring 25 disposed in the annular groove 34.

Figure 14:
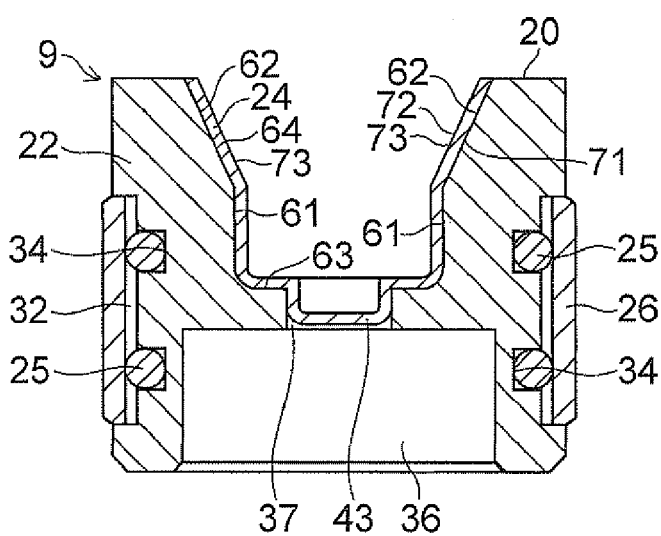
FIG. 14 is an explanatory cross-sectional view illustrating still another form of the rack guide shown in FIG. 1.
Figure 15:
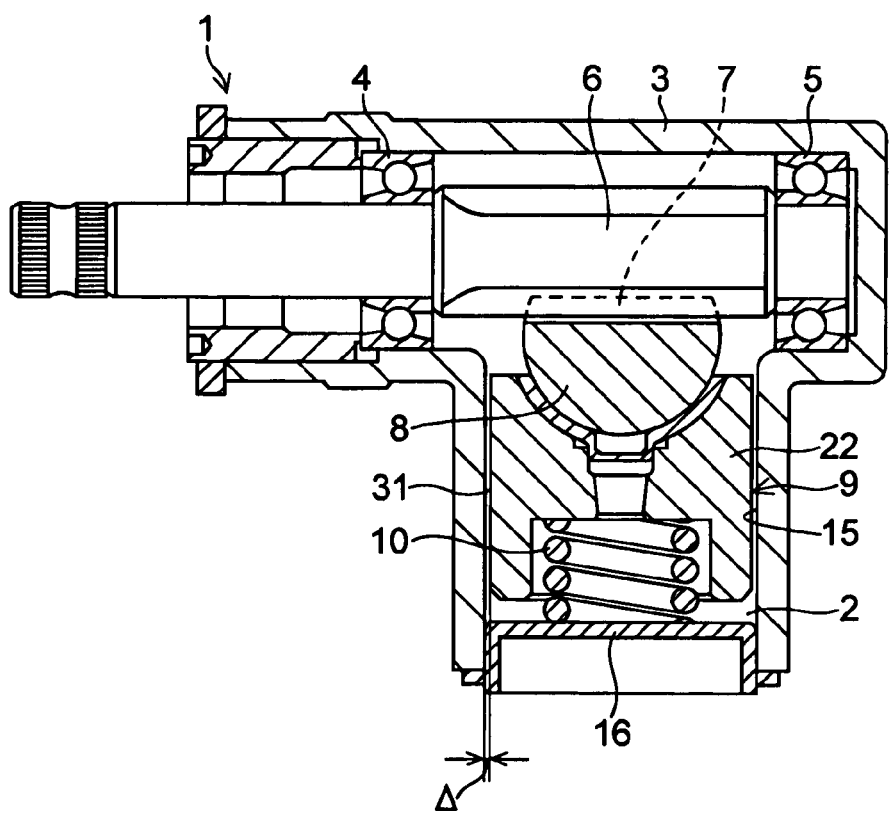
FIG. 15 is an explanatory cross-sectional view illustrating a conventional rack-and-pinion type steering apparatus.

The above-described rack guide 9 further includes the rack guide body 22 having the circular arc-shaped concave surface 21, as well as the slider 24 having the inner surface 23 having a shape complementary to the circular arc-shaped convex surface 19 of the rack bar 8 and the outer surface 42 having a shape complementary to the circular arc-shaped concave surface 21. Alternatively, as shown in FIG. 14, the rack guide 9 may include the rack guide body 22 provided on the one end face 20 side with a recessed surface 64 having a pair of flat surfaces 61 mutually opposing to each other, a pair of inclined surfaces 62 extending integrally in such a manner as to oppose each other from the pair of flat surfaces 61, respectively, and a bottom flat surface 63 extending integrally from the pair of flat surfaces 61 and having the through hole 37 disposed in the center; and the sliding plate piece 24 having an outer surface 71 and an inner surface 72 having shapes similar to that of the recessed surface 64. In this case, the sliding plate piece 24 at its bottomed cylindrical portion 43 is fitted in the through hole 37 of the rack guide body 22, and is seated at its outer surface 71 on the recessed surface 64 of the rack guide body 22. The sliding plate piece 24 at a pair of inclined surfaces 73 of its inner surface 72 is adapted to be brought into contact with the circular arc-shaped convex surface 19 of the rack bar 8 relatively movably in the direction A.

In the case where the rack guide 9 having the rack guide body 22 and the sliding plate piece 24 such as those shown in FIG. 14 is used, it is possible to use the rack bar 8 having inclined surfaces corresponding to the pair of inclined surfaces 73 instead of the rack bar 8 having the circular arc-shaped convex surface 19.

The invention claimed is:

1. A rack-and-pinion type steering apparatus comprising: a housing having a cylindrical holding hole in its interior; a pinion which is disposed rotatably in said housing and is rotated by steering; a rack bar which has rack teeth meshing with said pinion and is movable; a rack guide which is disposed movably in the holding hole within said housing, and which guides and supports said rack bar movably; and resilient means which is disposed between said housing and said rack guide to resiliently press the rack teeth of said rack bar against said pinion by means of said rack guide, wherein said rack guide includes: a rack guide body having a cylindrical outer peripheral surface, a wide annular recessed portion formed in the outer peripheral surface, and at least one narrow annular groove formed in a bottom surface of the wide annular recessed portion and having a narrower width than a width of the wide annular recessed portion; a sliding plate piece which is secured to said rack guide body and is brought into contact with an outer surface of said rack bar so as to support said the rack bar movably; an endless annular elastic member fitted and secured in the narrow annular groove of said rack guide body in such a manner as to project from an opening of the narrow annular groove; and a cylindrical bush which has a split groove and is fitted and secured in the wide annular recessed portion, such that said cylindrical bush on an outer peripheral surface side thereof projects from an opening of the wide annular recessed portion of said rack guide body, while an inner peripheral surface of said cylindrical bush abuts against an outer surface of said endless annular elastic member, said cylindrical bush being fitted in the holding hole of said housing with an interference, an outer peripheral surface of said cylindrical bush being movably in contact with a cylindrical inner peripheral surface of said housing defining the holding hole of said housing.

2. The rack-and-pinion type steering apparatus according to claim 1, wherein the wide annular recessed portion has a circular ring-shaped recessed portion formed in the cylindrical outer peripheral surface of said rack guide body over its entire circumferential area, and said cylindrical bush has a cylindrical portion which has one split groove and is fitted and secured in the annular recessed portion.

3. The rack-and-pinion type steering apparatus according to claim 2, wherein the wide annular recessed portion further has, in addition to the circular ring-shaped recessed portion, a pair of circular arc-shaped recessed portions continuous to the circular ring-shaped recessed portion and formed on mutually opposing outer peripheral surface portions in the cylindrical outer peripheral surface of said rack guide body, and said cylindrical bush further has, in addition to the cylindrical portion, a pair of circular arc-shaped projecting portions which are formed integrally on the cylindrical portion in face-to-face relation to each other with the split groove located therebetween and which are respectively fitted and secured to the pair of circular arc-shaped recessed portions.

4. The rack-and-pinion type steering apparatus according to claim 1, wherein said rack guide body is formed of aluminum or an aluminum alloy.

5. The rack-and-pinion type steering apparatus according to claim 1, wherein said endless annular elastic member is constituted by an O-ring made of rubber.

6. The rack-and-pinion type steering apparatus according to claim 1, wherein said cylindrical bush is formed of a thermoplastic synthetic resin such as polyacetal resin, polyamide resin, and polybutylene terephthalate resin.

7. The rack-and-pinion type steering apparatus according to claim 1, wherein an annular clearance between a bottom surface of the wide annular recessed portion of said rack guide body and the inner peripheral surface of the cylindrical bush has a radial width which is smaller than a radial width of an annular clearance between the outer peripheral surface of said rack guide body and the inner peripheral surface of said housing defining the cylindrical holding hole.

* * * * *